United States Patent Office 2,727,875
Patented Dec. 20, 1955

2,727,875

HEAT HARDENABLE SILOXANE POLYMERS WITH TIN CATALYST

Gerry P. Mack, Jackson Heights, and Emery Parker, New York, N. Y.

No Drawing. Application August 6, 1953,
Serial No. 372,793

6 Claims. (Cl. 260—29.4)

The invention relates to heat hardenable siloxane resin compositions, which are useful as protective coatings and particularly suitable to render fabrics water-repellent and crease resistant.

The polysiloxane oils used for this purpose are well known in the art. They include linear and cross-linked polymers, or blends thereof, and contain silicon atoms linked by oxygen, and more than one hydrocarbon radical attached to each silicon atom, whereby the number of said radicals is generally a fractional value higher than 1 and not, or not substantially, exceeding 2. Said hydrocarbon radicals may be alkyl (e. g. methyl), aryl (e. g. phenyl), alkaryl (e. g. tolyl), or aralkyl (e. g. phenylmethyl) radicals. The resins may contain two or more different radicals, and a part of the hydrocarbon radicals may also be replaced by hydrogen; they may have terminal hydroxyl groups, or terminal hydroxyl groups in which the hydrogen is wholly or in part replaced by alcohol radicals or carboxylic acid radicals. Representative examples are methyl polysiloxanes, methyl aryl polysiloxanes, methyl hydrogen polysiloxanes, alkyl alkoxy silicones, alkyl silicyl esters, and the like. They are soluble in conventional organic solvents and can be emulsified with addition of emulsifying agents in water.

It is also well known that these polymers are hardened by heating, and that this solidification can be catalyzed by the addition of small amounts of metal salts of organic acids. Among the many metal salts proposed for the catalytic polymerization of the polysiloxane oils, probably the most important are the tin salts. They are colorless, non-toxic, are highly reactive, and the quality of the cured resin is satisfactory as the cured resins are more resistant toward solvents. However, tin salts of organic acids which are soluble in the silicone oils, directly or in the presence of other organic solvents, do have a distinct disadvantage. They catalyze the polymerization to a large degree at room temperature and solutions containing the catalyst are unstable and gell in a few hours.

It has also been proposed to use inorganic tin salts such as stannous chloride, sulfate, nitrate, as curing agents. These tin salts have the advantage that they are water soluble and can be incorporated in the continuous or aqueous phase of the polysiloxane emulsions. However, these salts in aqueous solution split off strong acids, which attack acid sensitive supports to be coated such as textile fibers, paper, wood, metals and the like. The acidity of these inorganic tin salts in aqueous solution presents another serious disadvantage when the polysiloxanes are used together with thermosetting urea-formaldehyde and similar resins which are frequently added to impart crease resistance and wrinkle recovery to the fibers treated. The strongly acidic tin salts act as catalysts for the polymerization of the thermosetting resins with the result that the thermosetting resins are polymerized more quickly than the polysiloxanes; consequently, aqueous emulsions containing polysiloxanes, thermosetting resins of the urea-formaldehyde type and inorganic acidic tin salts are extremely unstable and break down easily due to premature precipitation of the thermosetting resin.

It is a principal object of the invention to provide aqueous emulsions of polysiloxanes which contain the curing agent dissolved in the aqueous phase so that the agent acts as a latent catalyst and becomes active only after the water has been substantially removed.

Another object of the invention is to provide aqueous emulsions which contain polysiloxane and dissolved in the aqueous phase a water-soluble thermosetting resin of the aminoplast group and a curing agent for the polysiloxane, which curing agent is nonacidic or has a pH at which the polymerization of the thermosetting resin is not, or not substantially, catalyzed.

Still another object of the invention is to provide aqueous solutions or emulsions of polysiloxanes, which contain water-soluble tin salts as curing agents, which curing agents are compatible with water-soluble aminoplast resins and reduce the curing times and lower the curing temperatures of the polysiloxanes without affecting the pleasant appearance and mechanical properties of the material to be protected.

Other objects and advantages will become apparent from a consideration of the specification and claims.

We have found that certain water soluble complex organic tin compounds are excellent curing agents for the polymerization of polysiloxane resins and particularly suitable when such resins are used together with water soluble aminoplast resins to impart to textile fabrics a high degree of water repellency and crease resistance. Suitable complex tin compounds are, for instance, the compounds obtained by the action of stannous hydroxide on hydroxy acids containing one or more alcoholic hydroxyl groups and one or more carboxyl groups or on the alkali or ammonium salts of these acids. Examples of such hydroxy acids are glycolic acid, lactic acid, beta hydroxy propionic acid, hydroxy butyric acid, glyceric acid, gluconic acid, mannonic acid, gulonic acid, glucoronic acid, tartronic acid, malic acid, tartaric acid, saccharic acid, citric acid, and the like. According to the proportions of reactants used and their content of hydroxyl groups, complexes of one mol of SnO with one or two moles of the acid can be obtained.

As aminoplast resins we may use for instance the condensation products of urea, thiourea, cyanamide, dicyanodiamide, dicyanodiamidine, guanidine, melamine, dimethyl hydantoin with formaldehyde or other water soluble aliphatic aldehydes.

It is a well known fact that hydroxy-carboxylic acids are sequestrants for a number of heavy and earthalkali metals such as iron, copper, cobalt, calcium, and the like. It can be assumed that in the case of our stannous complexes, mono and polyhydroxy carboxylic acids and their alkali salts act as sequestrants and the tin metal is bound in the form of a chelate possibly according to a formula

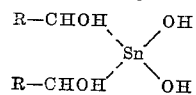

where R represents the rest of the mono or polyhydroxycarboxylic acid in which part or all of the hydrogens of the carboxylic acid groups are replaced by alkali metal or ammonia.

Complex tin compounds of the type described are essentially neutral, the pH of their aqueous solutions is 6.0 to 7.0, but they are sufficiently stable at a lower pH. They are soluble in water and can be readily incorporated in the aqueous phase of an emulsion, which aqueous phase can contain, beside the catalyst, the water soluble thermosetting resins and the acid catalyst necessary to polymerize the thermosetting resins. Being in the aqueous phase, the tin catalyst has no effect on the polysiloxane oil which is in the oil phase of the emulsion. Only after the water is removed by drying, the tin complex can exert its catalytic effect on the polysiloxane resin and polymerizes the silicone resin simultaneously with the polymerization of the thermosetting resins. Emulsions containing our tin complexes are stable on storage for a long period of time, they are essentially neutral and no acid is liberated during the baking process which would attack or injure the substrata to which the emulsion was applied.

The amount of the tin complex compounds required for a successful polymerization is about 0.1 to 10 per cent by weight of tin metal based on the weight of polymerizable silicon resin. The exact amount will depend on the conditions under which the curing reaction is performed and on the desired characteristics of the polymer or coating to be obtained. Higher catalyst concentrations shorten the curing time and/or lower the optimum curing temperatures.

The following examples are given to illustrate the invention but it should be understood that they are not intended to limit the scope of the invention in any way. All parts are given by weight unless specified otherwise.

*Example 1*

As a curing agent, a stannous hydroxide ammonium tartrate complex was prepared by dissolving 1 mole of stannous hydroxide in a solution containing 1 mole of ammonium tartrate. This compound is considered to correspond to the formula $(NH_4)_2SnOC_4H_2O_6$. The solution used contained 8 per cent by weight of tin. 3 grams of a non-ionic emulsifier of the fatty acid amide polyethylene oxide type were dispersed in 20 parts of cold water. 1 gram of oleic acid and 38.5 grams of a modified dimethyl silicone oil #81361 as designated by General Electric Co. were then added slowly under very strong stirring, preferably in an Eppenbach mixer or homogenizer, to said dispersion. After the emulsion was formed, 37.5 parts of water were added. This standard stock emulsion contained 38.5% of silicone oil. The emulsion was then diluted to 2.5% silicon content by adding 13 parts of the stock emulsion to 150 parts of water, to which 3 parts of solution containing the curing agent were added. This solution was diluted further with 34 parts of water to a total of 200 parts.

A piece of cotton fabric was dipped in this solution and squeezed through wringer rolls to a moisture content of about 120%. The fabric was then dried for 5 minutes at 115° C. and cured in a baking oven for 5 minutes at 160° C. Then the fabric was rinsed with cold water and dried again. The water repellency of the fabric was tested according to the spray rating test method 22–41 of the AATCC (Assoc. of Am. Textile Chemists and Colorists) and showed a spray rating of 100.

*Example 2*

The curing agent used was a stannous hydroxide sodium gluconate complex obtained by dissolving 1 mole of $Sn(OH)_2$ in an aqueous solution containing two moles of sodium gluconate and had the empirical formula $$Na_2[Sn(OH)_2(C_5H_6(OH)_5COO)_2]$$

The obtained solution had a pH of 6.5 and contained 7.5 per cent by weight of tin. 13 grams of the silicone stock solution as prepared in Example 1 were diluted with 84 grams of water to which 2.7 grams of the curing solution were added. Separately a resin solution was prepared consisting of 35 grams of a water soluble urea-formaldehyde condensation product containing 60% solids in 32 grams of water, and an acid catalyst was added at room temperature to this solution. The resin solution and silicone emulsion were then blended together, and a fabric was impregnated with this emulsion, squeezed to a moisture content of about 100–120%, dried at 115° C. and then baked for 5 minutes at 160° C. The fabric was then rinsed with warm water and dried again. The water repellency and crease resistance of the treated fabric were excellent and did not disappear after repeated washings, launderings and dry cleanings.

*Example 3*

30 parts of a modified polysiloxane resin consisting of a mixture of mono and dimethyl polysiloxanes and mono and dimethyl hydrogen polysiloxanes is emulsified in a colloid mill by adding to the silicone oil 3 parts of a quaternary ammonium halide octadecenyl dimethyl benzyl ammonium chloride in 967 parts of water to which was added 30 parts of a sodium citrate stannous hydroxide complex of the empirical formula $$Na_2[Sn(OH)_2 \cdot 2C_6H_6O_7]$$

containing 8% of tin and prepared by dissolving freshly precipitated stannous hydroxide in sodium citrate solution in a ratio of 1 tin to 2 citrate. The emulsion is prepared in a manner that the average particle size is below 2 microns.

A viscose rayon fabric is then impregnated with this emulsion, squeezed to 120% moisture content, dried at 90–100° C. and heat treated for 5 minutes at 150° C. The fabric is then rinsed in cold water and dried. The fabric is water repellent; its spray rating is 90 and it has a good soft hand.

What we claim is:

1. A composition of matter comprising in aqueous emulsion a heat-hardenable siloxane polymer having more than one hydrocarbon radical attached to each silicon atom, whereby the number of said radicals is a fractional value higher than 1 and not substantially exceeding 2 and as a curing catalyst, dissolved in the aqueous phase of the emulsion, a water soluble tin adduct of stannous hydroxide with a member of the group consisting of aliphatic hydroxy acids containing at least one alcoholic hydroxyl group and at least one carboxylic group, and ammonium and alkali metal salts of said acids, in an amount of about 0.1 to 10 per cent by weight of tin based on the weight of said siloxane polymer.

2. A composition of matter comprising in aqueous emulsion a heat-hardenable siloxane polymer having more than one hydrocarbon radical attached to each silicon atom, whereby the number of said radicals is a fractional value higher than 1 and not substantially exceeding 2 and as a curing catalyst for said siloxane polymer the adduct of stannous hydroxide with ammonium tartrate dissolved in the aqueous phase of said emulsion, the amount of said adduct being about 0.1 to 10 per cent by weight of tin based on the weight of said siloxane polymer.

3. A composition of matter comprising in aqueous emulsion a heat-hardenable siloxane polymer having more than one hydrocarbon radical attached to each silicon atom, whereby the number of said radicals is a fractional value higher than 1 and not substantialy exceeding 2 and as a curing catalyst for said siloxane polymer the adduct of stannous hydroxide with sodium gluconate dissolved in the aqueous phase of said emulsion, the amount of said adduct being about 0.1 to 10 per cent by weight of tin based on the weight of said siloxane polymer.

4. A composition of matter comprising in aqueous emulsion a heat-hardenable siloxane polymer having more than one hydrocarbon radical attached to each silicon atom, whereby the number of said radicals is a fractional value higher than 1 and not substantially exceeding 2 and as a curing catalyst for said siloxane polymer the adduct of stannous hydroxide with sodium citrate dissolved in the aqueous phase of said emulsion, the amount of said adduct being about 0.1 to 10 per cent by weight of tin based on the weight of said siloxane polymer.

5. A composition of matter comprising as major constituents in aqueous emulsion a heat-hardenable siloxane polymer having more than one hydrocarbon radical attached to each silicon atom, whereby the number of said radicals is a fractional value higher than 1 and not substantially exceeding 2 and a water-soluble condensation product of formaldehyde with a member of the group consisting of urea, thiourea, cyanamide, dicyanodiamide, dicyanodiamidine, guanidine, melamine, dimethyl-hydantoin, and as a minor constituent an adduct of stannous hydroxide with a member of the group consisting of aliphatic hydroxy acids containing at least one alcoholic hydroxyl group and at least one carboxylic group, and ammonium and alkali salts of said acids, said adduct being present in an amount of about 0.1 to 10 per cent by weight of tin based on the weight of said siloxane polymer and being dissolved in the aqueous phase of the emulsion to a solution having a pH not substantially exceeding 7 so as to prevent polymerization of said water-soluble formaldehyde condensation product while in solution, and exerting a curing effect on the siloxane polymer substantially only after removal of the water of the emulsion.

6. In the preparation of emulsions suitable for rendering textiles water repellent, which emulsions contain a siloxane polymer in the oily phase and a water-soluble aminoplast resin in the aqueous phase, said siloxane polymer having more than one hydrocarbon radical attached to each silicon atom, whereby the number of said radicals is a fractional value higher than 1 and not substantially exceeding 2, and said aminoplast resin being the condensation product of formaldehyde with a member of the group consisting of urea, thiourea, cyanamide, dicyanodiamide, dicyanodiamidine, guanidine, melamine, dimethyl hydantoin, the improvement which consists in incorporating in the aqueous phase of the emulsion as a curing agent for the siloxane polymer a substantially non-acidic adduct of stannous hydroxide with a member of the group consisting of aliphatic hydroxycarboxylic acids, and ammonium and alkali metal salts of said acids, which curing agent is employed in an amount of about 0.1 to 10 per cent by weight of tin based on the weight of said siloxane polymer and is substantially inactive with respect to the siloxane polymer and the aminoplast resin during storage of the emulsion and becomes active only after the emulsion has been applied to a textile and is heated therewith.

No references cited.